United States Patent

Tennant et al.

[11] Patent Number: 5,658,480
[45] Date of Patent: Aug. 19, 1997

[54] HEATING ELEMENT CONTROL

[75] Inventors: James A. Tennant, Perrysville; Robert L. Newman, Mansfield, both of Ohio

[73] Assignee: Therm-O-Disc, Incorporated, Mansfield, Ohio

[21] Appl. No.: 524,002

[22] Filed: Sep. 5, 1995

[51] Int. Cl.⁶ .................................................. H05B 1/02
[52] U.S. Cl. .......................... 219/519; 219/519; 219/508; 219/486; 219/485; 361/2; 361/166; 361/168.1
[58] Field of Search .................... 219/519, 481, 219/488, 497, 508, 509, 485; 361/1–5, 13, 37, 8, 92, 94, 96, 152–156, 166–169.1

[56] References Cited

U.S. PATENT DOCUMENTS

| | | | |
|---|---|---|---|
| 4,405,904 | 9/1983 | Oida et al. | 331/87 |
| 4,704,652 | 11/1987 | Billings | 361/5 |
| 5,064,998 | 11/1991 | Holling | 361/94 |
| 5,079,409 | 1/1992 | Takada et al. | 219/497 |
| 5,406,128 | 4/1995 | Arinobu | 307/64 |

*Primary Examiner*—Mark H. Paschall
*Attorney, Agent, or Firm*—Jones, Day, Reavis & Pogue

[57] ABSTRACT

The temperature of each heating element among a plurality of heating elements is regulated by opening and closing a relay associated with each heating element in response to the monitored temperature of each heating element. The voltage across all of the relays is interrupted simultaneously at predetermined intervals, and each relay is opened or closed only when the voltage is interrupted. This permits the use of relays having lower current ratings and also extends relay life.

6 Claims, 1 Drawing Sheet

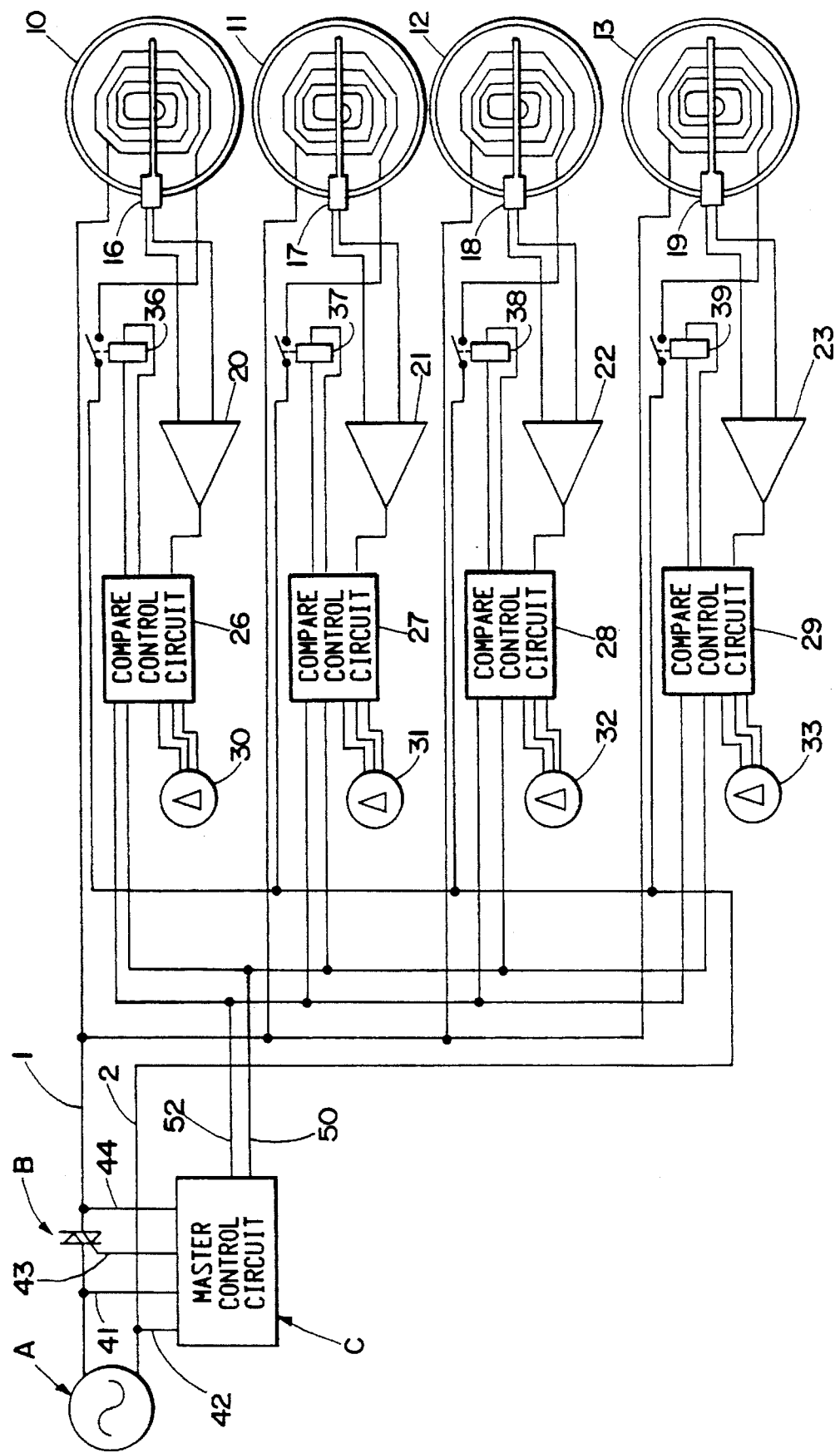

HEATING ELEMENT CONTROL

BACKGROUND OF THE INVENTION

This application relates to electrical controls and, more particularly, to controls for regulating a plurality of separate loads. The invention is particularly applicable to controls for regulating a plurality of separate heating elements and will be described with specific reference thereto. However, it will be appreciated that the invention has broader aspects and can be used for regulating a plurality of electrical loads other than heating elements.

Electrical cooking ranges commonly have a plurality of separate heating elements that are individually controllable. One type of control is a bi-metal thermostat having an internal heater. The spring force on the bi-metal is manually adjustable to vary the temperature of the heating element and there is no temperature feedback from the heating element to the control.

Another type of control uses a high current relay for each heating element. The relays are opened and closed in accordance with the temperature measured by sensors located adjacent the heating elements. Relays that are capable of handling 10-15 amps for a 2,000 watt heating element are very expensive, particularly when they are required to provide an extended full load cycle life.

Another type of control uses a high current semiconductor such as a triac for each heating element. The triacs allow control of power to each heating element and provide fairly accurate temperature control but it is expensive to use an individual triac and an associated heat sink for each heating element.

It would be desirable to provide a control arrangement that eliminates disadvantages of prior systems while still providing variable control of each heating element.

SUMMARY OF THE INVENTION

A control for a plurality of separate heating elements includes a relay with a low current rating for each heating element. Each relay is opened or closed only when the voltage across the relay is substantially zero.

In a preferred arrangement, a voltage reducer is provided for reducing the voltage across the relays at periodic intervals. The voltage reducer includes a triac and a counter for counting cycles of alternating voltage. For each ten cycles of line voltage, the counter may gate the triac on for nine cycles and turn the triac off for one cycle.

The voltage reducer also provides signals to a control circuit for indicating whether the triac is on or off and for indicating when the line voltage crosses zero. The control circuit also compares inputs from a manually adjustable potentiometer switch and from heating element temperature sensor. When the difference between the temperature sensor signal and the potentiometer switch signal indicates that the heating element does or does not require power, the control circuit closes or opens the relay when the voltage reducer indicates that the line voltage is crossing zero and the triac is off.

It is a principal object of the present invention to provide an improved temperature control for a plurality of separate electrical heating elements.

It is also an object of the invention to provide an improved electrical control that includes relays and wherein the relays are opened or closed only when the voltage across the relays is substantially reduced.

BRIEF DESCRIPTION OF THE DRAWING

The drawing shows an electrical schematic for controlling a plurality of separate heating elements with the improved control of the present application.

DESCRIPTION OF A PREFERRED EMBODIMENT

Referring now to the drawing, wherein the showings are for purposes of illustrating a preferred embodiment of the invention only and not for purposes of limiting same, an alternating voltage source A is connected across lines 1,2 for providing power to electrical heating elements 10-13. The heating elements may be of the type used on the cook top of cooking ranges. A temperature sensor or monitor 16-19 is associated with each heating element 10-13. The temperature monitors may be platinum resistance thermometers that output a variable resistance signal proportional to the temperature of the associated heating element.

The resistance signal that is output from each temperature monitor 16-19 is received by a signal translator 20-23 that translates the resistance signal to a voltage signal and inputs it to a control circuit 26-29. A manually adjustable potentiometer switch 30-33 provides a variable input signal to control circuits 26-29 proportional to the desired temperature of each heating element.

Each control circuit 26-29 compares the signals received from translator 20-23 and potentiometer switches 30-33 to either supply or interrupt power to heating elements 10-13.

Each heating element 10-13 is directly connected with line 1 of voltage source A and is connected through the contacts of a relay 36-39 with line 2. The coils of relays 36-39 are connected with control circuits 26-29.

A voltage reducer is provided for reducing the voltage across all of the relays at periodic intervals. In one arrangement, a triac B is connected in line 1, and a master circuit C is connected with triac B, lines 1 and 2, and control circuits 26-29. Master circuit C is shown connected by leads 41,42 with lines 1,2. Master circuit C includes a counter for counting line cycles of alternating voltage and also includes a zero cross detector for detecting when the line voltage crosses zero. Control circuit C is shown connected by a lead 43 for gating triac B and by a lead 44 to line 1 on the output side of triac B for sensing when the triac is off.

Control circuit C gates triac B on for a predetermined number of line cycles and turns the triac off for a predetermined number of line cycles. By way of example, for each ten cycles of line voltage, master circuit C may gate triac B on for nine cycles and turn triac B off for one cycle. Thus, the output voltage from the triac is continuously cycle count proportioned to 90%. Obviously, other cycle times may be used.

Each control circuit 26-29 is connected by line 50 with master control C that outputs a signal to inform each control circuit 26-29 when triac B is on and when triac B is off. Each control circuit 26-29 is also connected by line 52 with master circuit C for receiving a high or low voltage signal from the master circuit to indicate when line voltage is crossing zero. The output to line 52 that indicates when line voltage is crossing zero can be either high or low. For purposes of explanation, a high output on line 52 will be used to indicate that line voltage is crossing zero. A low output on line 52 will then indicate that line voltage is at some positive or negative level other than zero.

Control circuits 26-29 supply or interrupt power to the coils of relays 36-39 to close or open the relay contacts only when control circuits 26-29 receive signals from master circuit C on lines 50,52 indicating that triac B is off and line voltage is crossing zero. Thus, master circuit C and triac B effectively define a voltage reducer for substantially reducing the voltage across the contacts of relays 36-39 prior to opening or closing of the relay contacts.

In operation of the system, potentiometer switches 30–33 are manually adjusted for desired temperature settings of heating elements 10–13. Resistance signals from temperature monitors 16–19 send resistance signals to translators 20–23 that are converted to voltage signals and are sent to control circuits 26–29. The signals from translators 20–23 and potentiometer switches 30–33 are compared by control circuits 26–29 for supplying or interrupting power to heating elements 10–13. When a control circuit senses that power is required for a heating element, it will close the relay associated with that heating element. However, the control circuit will operate to close the relay only when the signals received on lines 50,52 tell the control circuit that triac B is off and line voltage is crossing zero. Likewise, the control circuit will operate to open its associated relay only when the signals received on lines 50,52 indicate that triac B is off and that line voltage is crossing zero.

It will be recognized that the control arrangement of the present application can be used in cooking ranges having glass tops or sealed heating elements to allow incorporation of temperature sensors in each heating element. However, the control arrangement can also be used with any heating element in cooking appliances and with other types of electrical loads.

With the arrangement of the present application, each relay 36–39 can have a rating of 3–5 amps while controlling a 10–12 amp load because the contacts of the relays are opened or closed only when voltage across the contacts is substantially zero. The cycle life of each relay is significantly improved by this arrangement.

It will be recognized that it is also possible to use the signals on lines 50,52 for regulating the power to the coils of relays 36–39. For example, control circuits 26–29 can be arranged to reduce voltage on the relay coils to a level that just holds the relay contacts closed. Voltage to the relays would then be dropped to zero when the signal on line 50 indicated that triac B was off and when the signal on line 52 indicated that the line voltage was crossing zero. This would provide tighter timing control on relay drop out. The same principle could be used for relay pull in. Control circuits 26–29 would apply a high voltage to the coils of relays 36–39 when the signals on lines 50,52 indicated that triac B was off and line voltage was crossing zero. The voltage to the coils of relays 36–39 would then be significantly reduced to a level for just holding the contacts closed after the signals on lines 50,52 indicated that triac B was on and that the line voltage was at a positive or negative level other than zero.

The improved arrangement of the present application provides a positive mechanical open circuit condition by the use of relays. The control system provides true proportional power control to each heating element along with heating element temperature control while using inexpensive relays having substantially lower current ratings than the current being controlled.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. In a control for individually controlling each of a plurality of electric heating elements connected with a common voltage source, a separate relay for each of said plurality of electric heating elements for selectively connecting each heating element to and disconnecting it from said voltage source to regulate the temperature of each of said plurality of electric heating elements, each said relay having relay contracts connected between said voltage source and one of said plurality of electric heating elements, a temperature monitor for monitoring the temperature of each of said plurality of electric heating elements and providing a monitored temperature signal, an adjustable temperature control for each of said plurality of electric heating elements for providing a desired temperature signal, a comparator control circuit for each of said plurality of electric heating elements for comparing said monitored and desired temperature signals for each of said plurality of electric heating elements for cycling each of said relays to maintain the temperature of each of said plurality of electric heating elements as set by its associated said temperature control by selectively opening and closing said relay contacts, a voltage reducer between said voltage source and all of said relay contacts for interrupting the voltage applied by said voltage source to all of said relay contacts substantially simultaneously, and a master control circuit for placing said voltage reducer in a voltage interrupting condition and a substantially full voltage condition and providing a condition signal to all of said comparator control circuits indicative of whether said voltage reducer is in said voltage interrupting condition or in said substantially full voltage condition, and each of said comparator control circuits being operative to close or open its associated relay only when said condition signal from said master control circuit indicates that said voltage reducer is in said voltage interrupting condition.

2. The control of claim 1 wherein said voltage source is an alternating voltage source and said master control includes a counter for counting alternating voltage cycles and placing said voltage reducer in said voltage interrupting condition during predetermined ones of the cycles.

3. The control of claim 2 wherein said voltage reducer is triac that is turned off during said predetermined ones of said cycles.

4. The control of claim 1 wherein said voltage source comprises an alternating voltage source and said master control includes a zero crossing detector for detecting when the alternating voltage crosses zero and providing a zero crossing signal to all of said comparator control circuits, and each of said comparator control circuits being operative to close or open its associated relay only when said zero crossing signal indicates that line voltage is crossing zero.

5. In a control for individually controlling each of a plurality of electric heating elements connected with a common voltage source, a separate relay for each of said plurality of electric heating elements for selectively connecting each heating element to and disconnecting it from said voltage source to regulate the temperature of each of said plurality of electric heating elements, each said relay having relay contacts connected between said voltage source and one of said plurality of electric heating elements, a temperature monitor for monitoring the temperature of each of said plurality of electric heating elements and providing a monitored temperature signal, an adjustable temperature control for each of said plurality of electric heating elements for providing a desired temperature signal, a comparator control circuit for each of said plurality of electric heating elements for comparing said monitored and desired temperature signals for each of said plurality of electric heating elements for operating each of said relays to selectively open or close said relay contracts, a triac between said voltage source and all of said relay contacts, and a master control circuit for cycling said triac on and off at predetermined intervals and for providing a triac condition signal to all of said comparator control circuits indicative of whether said triac is on or off, and each of said comparator control circuits being operative to close or open its associated relay only when said condition signal from said master control circuit indicates that said triac is off.

6. A control for a plurality of heating elements, each heating element being individually connected by its own relay with a voltage source, a temperature monitor for monitoring the temperature of each of said plurality of electric heating elements and providing a monitored temperature signal, an adjustable temperature control for selectively setting a desired temperature for each of said plurality of electric heating elements and providing a desired temperature signal, a comparator control circuit for comparing said monitored and desired temperature signals to provide a comparator control signal for cycling each said relay between open and closed positions to regulate the temperature of its associated heating element, a single voltage reducer for reducing the voltage across all of said relays simultaneously, and said comparator control signal being operative to close or open each said relay only when the voltage thereacross is substantially reduced by said voltage reducer.

* * * * *